United States Patent [19]

Takizawa et al.

[11] Patent Number: 5,340,297

[45] Date of Patent: Aug. 23, 1994

[54] MOLDING MACHINE HAVING CONTROLLED INJECTION SCREW SPEED AND RESIN PRESSURE

[75] Inventors: Michiaki Takizawa; Takashi Hakoda, both of Sakaki, Japan

[73] Assignee: Nissei Jushi Kogyo Kabushiki Kaisha, Nagano, Japan

[21] Appl. No.: 991,319

[22] Filed: Dec. 16, 1992

[30] Foreign Application Priority Data

Dec. 19, 1991 [JP]  Japan .................................. 3-354667

[51] Int. Cl.$^5$ ............................................. B29C 45/77
[52] U.S. Cl. ................................. 425/145; 264/40.7; 425/149
[58] Field of Search ................. 425/145, 149; 264/40.7

[56] References Cited

U.S. PATENT DOCUMENTS 5,062,784  11/1991  Inaba et al. ............................ 425/145
5,223,191   6/1993  Tatsuno et al. ....................... 425/145

Primary Examiner—Tim Heitbrink

[57] ABSTRACT

A controller for a molding machine is capable of easily setting control data without considering the speed-control area and the pressure-control area. To achieve the object, the controller comprises: an input unit for inputting speed of a movable section of the molding machine with respect to positions thereof and time, and resin pressure; a memory for storing data, which include the speed of the movable section and the resin pressure inputted; and a control unit for controlling the speed of the movable section and the resin pressure on the basis of the data stored in the memory. In the controller, the speed and the pressure can be inputted independently, and proper control data, which match molding conditions, can be defined easily.

10 Claims, 2 Drawing Sheets

MOLDING MACHINE HAVING CONTROLLED INJECTION SCREW SPEED AND RESIN PRESSURE

BACKGROUND OF THE INVENTION

The present invention relates to a controller for a molding machine, more precisely relates to a controller for a molding machine, which is capable of controlling speed of a movable section of a resin-pressurizing mechanism of the molding machine and resin pressure.

In an injection molding machine, for example, shapes of products, types of resin, types of molds, etc. have been more complex and precise, so that speed of an injection screw and injection pressure (resin pressure) must be controlled in multiple stages. To execute multistage control, conventional injection molding machines have controllers to which the speed of the injection screw and the resin pressure for each stage are inputted. Conventional control patterns are shown in FIG. 3.

In conventional control patterns of the injection molding machine, there are a speed-control area A, in which the speed of the injection screw is mainly controlled, and a pressure-control area B, in which injection pressure is mainly controlled (see FIG. 3). The speed-control area A is between an initial position IP and a predetermined position C, which is called "V-P switching position". In the speed-control area A, the speed of the injection screw with respect to its position on the stroke is controlled in multiple stages; the injection pressure is not precisely controlled. When the injection screw reaches the V-P switching position, the control area is changed from the speed-control area A to the pressure-control area B. In the pressure-control area B, the injection pressure with respect to time is controlled in multiple stages; the speed of the injection screw is not precisely controlled.

However, the conventional controller has the following disadvantages.

Firstly, in case of complex molding in which various conditions, such as shapes of products, molding materials, types of molds, it is difficult to control molding machines in the speed-control area and the pressure-control area separately. For example, there are cases, in which multistage control of the injection pressure is required in the speed-control area, and vice versa. In these cases, if the speed and the pressure are separately controlled in the control areas, it is difficult to mold desired products.

Secondly, to separately input control data (speed and pressure) in the speed-control area and the pressure-control area, the V-P switching position must be defined. But it is difficult for inexperienced operators to define a proper V-P switching position. It is further difficult to define the control data according to the V-P switching position.

SUMMARY OF THE INVENTION

An object of the present invention is to provide a controller for a molding machine, which is capable of easily setting control data without considering the speed-control area and the pressure-control area.

To achieve the object, the controller of the present invention comprises:

input means for inputting speed of a movable section of a resin-pressurizing mechanism of the molding machine with respect to positions thereof and time, and resin pressure;

memory means for storing data, which include the speed of the movable section and the resin pressure inputted; and control means for controlling the speed of the movable section and the resin pressure on the basis of the data stored in the memory means.

In the controller, the control means controls the speed of the movable section and the resin pressure on the basis of the data stored in the memory means, so that operators are able to independently input the speed of the movable section and the resin pressure without considering the speed-control area and the pressure-control area. Namely, the speed and the pressure can be inputted independently, and proper control data, which match molding conditions, can be defined easily.

Especially, in the controller further having a display unit for displaying a graph, which shows the relationship between the speed of the movable section and the resin pressure, operators are capable of watching the graph while inputting the control data. By watching the graph, the data can be inputted and it can be easier for even inexperienced operators to set up proper control patters in a short time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described by way of an example and with reference to the accompanying drawings which are given by way of illustration only, and thus are not limitative of the present invention, and in which.

DETAILED DESCRIPTION OF A PREFERRED EMBODIMENT

A preferred embodiment of the present invention will now be described in detail with reference to the accompanying drawings.

Figure 1:
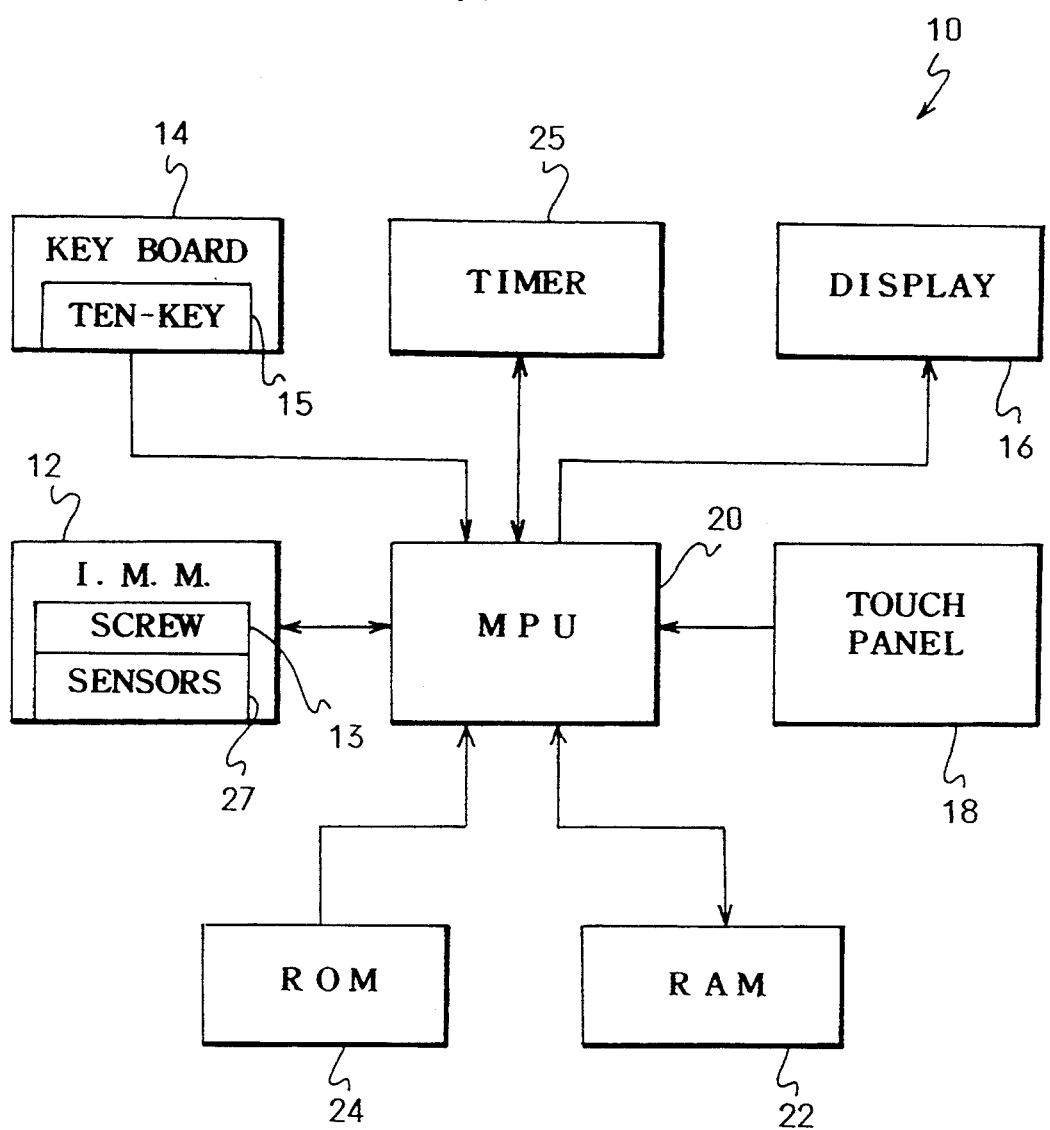
FIG. 1 is a block diagram of a controller of the embodiment of the present invention.

In FIG. 1, an injection molding machine 12 has a known structure with an injection screw 13, etc.. The injection molding machine 12 is controlled by a controller 10 of the present embodiment.

The injection screw 13 is a movable section of a resin-pressurizing mechanism and driven by an oil pump (not shown) so as to fill melted resin in molds.

A keyboard 14, which is an example of input means, has a ten-key section 15 for inputting numerical values. The keyboard 14 is capable of inputting control data, which include the speed of the injection screw 13 and the injection pressure (resin pressure) with respect to the position of the injection screw 13 and/or time, as numerical values. Besides the control data, operator's commands, etc. are inputted by the keyboard.

A color display unit 16 is a color CRT or a color LCD. The display unit 16 is capable of showing an input-picture for inputting the control data including the speed of the injection screw 13 and the injection pressure with respect to the position of the injection screw 13 and/or time. The display unit 16 is capable of showing graphs, which show control patterns of the injection molding machine 12 as the speed of the injection screw 13 and the injection pressure (resin pressure), as pulse-shaped graphs. Besides the input-picture and the graphs, the display unit 16 is capable of showing various data, information processed, etc..

A touch panel 18, which is an example of assigning means, is capable of assigning items, which include the speed of the injection screw 13 and the injection pressure (resin pressure), to be inputted by the keyboard 14. The touch panel 18 is made of a transparent material and provided to cover a screen of the display unit 16. There are provided multiple contact points, which correspond to the items shown on the input-picture, on the touch panel 18. The items are selected by selectively touching the contact points with an operator's finger. The numerical values of the items selected are inputted by the keyboard 14.

A microprocessor (MPU) 20 has a function of control means. The MPU 20 controls the speed of the injection screw 13 and the resin pressure on the basis of the control data stored in a RAM 22. To preferably control the speed of the injection screw 13 and the resin pressure, the MPU 20 is connected to sensors 27, which are a potentiometer for detecting the position and the speed of the injection screw 13, a pressure-sensitive element for detecting the injection pressure, etc.. Besides the function of the control means, the MPU 20 controls the injection molding machine 12 on the basis of control programs.

The RAM 22 is an example of memory means for storing the inputted control data, which include the speed of the injection screw 13 and the resin pressure with respect to the position of the injection screw 13 and the time, as table data. Besides the control data, the RAM 22 stores data inputted to the MPU 20, information processed by the MPU 20, etc.. Note that, secondary memories, e.g. IC memory cards, may be used as memory means.

A ROM 24 stores an operating system of the MPU 20, control programs and data for the controller 10.

A timer 25 is capable of measuring a period of time from specific time points.

Successively, how to input the control data will be explained.

Firstly, the speed data of the injection screw 13 is explained.

An operator directs the MPU 20 to input the speed data of the injection screw 13 by operating the touch panel 18. The operator watches the input-picture on the screen of the display unit 16 and inputs a number of speed control stages, positions of changing the speed of the injection screw 13, and the speed at the positions of changing the speed thereof. In the present embodiment, the positions of changing the speed are assigned by positions on the stroke of the injection screw 13, but, in some cases, they can be assigned by time.

Next, the injection pressure of the injection screw 13 is explained.

The operator directs the MPU 20 to input the injection pressure data by operating the touch panel 18. The operator watches the input-picture on the screen of the display unit 16 and inputs a number of pressure control stages, time points of defining time periods, and the injection pressure during each time period. In the present embodiment, the time periods are assigned by the time during which the injection screw 13 moves on its stroke, but, in some cases, they can be assigned by the position on the stroke thereof.

The control data inputted are stored in the RAM 22 as table data, and shown on the display unit 16 as pulse-shaped graphs of control patterns. An example of the graphs is shown in FIG. 2.

Figure 2:
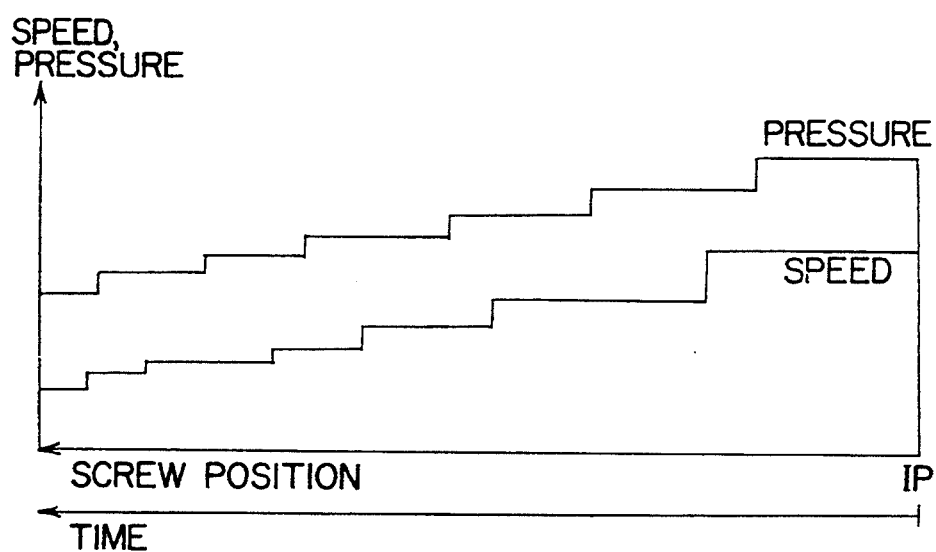
FIG. 2 is a graph showing an example of control data.
Figure 3:
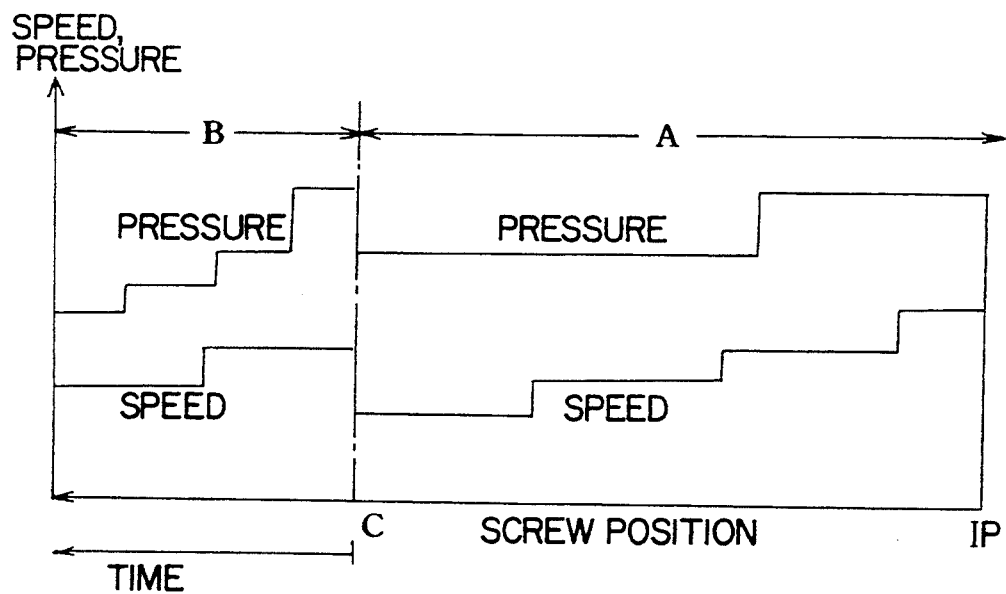
FIG. 3 is a graph showing an example of conventional control data.

In FIG. 2, as to the speed of the injection screw 13, an abscissas axis of the graph is the position of the injection screw 13. Namely, the right end is an initial position (IP) at which a distance between the injection screw 13 and molds is the greatest; the left end is a stroke end at which the distance is the smallest. According to FIG. 2, the speed of the injection screw 13 is reduced in stages with the forward movement thereof.

On the other hand, as to the injection pressure, an abscissas axis of the graph is the time period from when the injection screw 13 leaves the IP. Namely, at the right end, the time period is zero; at the left end, the time period is the greatest. According to FIG. 2, the injection pressure is also reduced in stages with the forward movement of the injection screw 13, As clearly shown in FIG. 2, there is no concept of the V-P switching in the present embodiment, the operator is able to set up the speed of the injection screw 13 and the injection pressure independently. Without considering the mutual relationship between them both and while watching the graphs, the operator is able to easily input the control data.

In the above described embodiment, the resin pressure was the injection pressure, but it can be pressure in molds, which can be measured by a pressure-sensitive sensor. The driving means for moving the movable section (the injection screw 13) was an oil pump but the means can be electric motors, compressed air, etc..

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A controller for a molding machine, comprising:
   input means for inputting speed of a movable section of a resin-pressurizing mechanism of said molding machine with respect to positions thereof and time, and resin pressure;
   memory means for storing data, which include the positions and time for the speed of said movable section and the resin pressure inputted;
   control means for controlling the speed of said movable section and the resin pressure on the basis of the data stored in said memory means including the positions and time of the movable section;
   a display unit for displaying a graph, which shows the relationship between the speed of said movable section and the resin pressure; and
   assigning means for changing the graph displayed on the display unit to thereby change the relationship between the speed of the movable section and the resin pressure, the assigning means being on the display of the display unit.

2. The controller for a molding machine according to claim 1 wherein, said molding machine is an injection molding machine.

3. The controller for a molding machine according to claim 1 wherein, said input means is a keyboard.

4. The controller for a molding machine according to claim 3 wherein, said keyboard includes a ten-key section for inputting the speed of said movable section and the resin pressure as numerical values.

5. The controller for a molding machine according to claim 1, wherein the assigning means changes the speed of said movable section and the resin pressure, to be inputted by said input means.

6. The controller for a molding machine according to claim 5 wherein, said assigning means is a touch panel.

7. The controller for a molding machine according to claim 1, wherein the assigning means comprises a touch panel for changing the speed of said movable section and the resin pressure, to be inputted by said input means, said touch panel covering a screen of said display unit.

8. The controller for a molding machine according to claim 1, wherein, the display unit displays the graph which shows the relationship between the speed of said movable section and the resin pressure as a pulse-shaped graph.

9. The controller for a molding machine according to claim 1 wherein, said memory means is a RAM.

10. The controller for a molding machine according to claim 2 wherein, said movable section is an injection screw.

* * * * *